(12) United States Patent
Hauptmann et al.

(10) Patent No.: US 6,779,444 B2
(45) Date of Patent: Aug. 24, 2004

(54) PRINTING FORM AND PROCESS FOR PRODUCING THE PRINTING FORM

(75) Inventors: Gerald Erik Hauptmann, Bammental (DE); Uwe Ernst, Mannheim (DE); Tobias Müller, Hirschberg (DE); Bernd Vosseler, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 10/210,663

(22) Filed: Aug. 1, 2002

(65) Prior Publication Data

US 2003/0025241 A1 Feb. 6, 2003

(30) Foreign Application Priority Data

Aug. 1, 2001 (DE) .......................................... 101 37 537
Mar. 22, 2002 (DE) .......................................... 102 13 012

(51) Int. Cl.[7] .............................. B41C 1/045; B41C 1/08
(52) U.S. Cl. .................................... 101/150; 101/401.1
(58) Field of Search ................................. 101/150, 153, 101/170, 401.1, 3.1, 4, 28, 32

(56) References Cited

U.S. PATENT DOCUMENTS 3,561,358 A * 2/1971 Weigl ........................... 430/49
5,233,921 A    8/1993 John ........................... 101/349
5,892,589 A * 4/1999 Beckett et al. ............. 358/3.31
6,347,584 B1 * 2/2002 Kawamoto et al. ......... 101/170

FOREIGN PATENT DOCUMENTS

| DE | 195 44 099 A1 | 5/1997 |
| DE | 197 46 174 C1 | 7/1999 |
| DE | 197 18 906 A1 | 9/1999 |
| JP | 4-312883 | * 11/1992 |
| JP | 6-143854 | * 5/1994 |
| JP | 10-250250 | * 9/1998 |
| WO | WO 00/40423 | 7/2000 |

OTHER PUBLICATIONS

Helmut Kipphan: "Handbook of Print Media", *Springer Verlag*, pp. 677–678.

* cited by examiner

*Primary Examiner*—Stephen R. Funk
(74) *Attorney, Agent, or Firm*—Laurence A. Greenberg; Werner H. Stemer; Gregory L. Mayback

(57) ABSTRACT

A process for producing a printing form includes forming a multiplicity of blind holes opening into a surface of a spatial or three-dimensional structure of the printing form, the blind holes serving for receiving a medium therein, and providing a propellant in the printing form for assisting in expelling the medium from the blind holes. A printing form produced by the process is also provided.

32 Claims, 6 Drawing Sheets

PRINTING FORM AND PROCESS FOR PRODUCING THE PRINTING FORM

BACKGROUND OF THE INVENTION

Field of the Invention

The invention relates to a printing form and a process for producing the printing form.

A suction printing process is a novel gravure printing process, such as is described in detail in the International Publication No. WO 00/40423. A gravure printing process is characterized by depressing those printing form elements which do the printing. The nonprinting form elements lie at a constant level. Before printing, the entire printing form is inked, i.e., flooded with printing ink. Suitable devices, such as wipers or doctor blades, ensure that the printing ink on the nonprinting form elements is removed before printing. Printing ink therefore remains only in the depressions. A high contact pressure and the adhesion forces between the printing material and the ink effect ink transfer from the depressions to the printing material.

The traditional gravure printing process, i.e., gravure printing which is variable only in depth or gravure printing which is variable both in depth and in area are, as printing processes, quite simple, however, the production of the printing form is very expensive. As explained hereinbefore, the gravure printing process is based upon introducing ink into the depressions, which have been engraved in a cylinder or plate in accordance with an image, and then transferred to paper in a comparatively simple printing unit with the aid of an impression cylinder. The production of the printing form is complicated and costly, but the print quality that is achieved is of very high level, and the technology of the printing unit in the rotary gravure printing system is simple when compared with offset printing. In particular, the high costs in the production of the printing form are the reason that the gravure printing process is used only for very large editions in the range of millions of prints.

For this reason, there has been no lack of efforts to simplify the production of the printing form for gravure printing. For example, U.S. Pat. No. 5,233,921 describes a printing form which comprises an easily deformable core and a plate formed with depressions therein, the plate being disposed above the core. The printing form is in the form of a cylinder, and the depressions formed in the plate can be changed depending upon the amount of heat supplied to the depressions. The volume of the individual depressions is consequently controllable in accordance with the respectively supplied heat. A printing form suitable for gravure printing is thereby attained, wherein, in a conventional manner, ink is introduced into the depressions and then applied to printing material via a conventional gravure printing process. The size and the contrast of individual raster dots in the image to be printed can be controlled by the volume of the individual depressions. A difficulty remains, however, in inserting an adequate amount of the ink into the depressions. If the depressions are comparatively small in diameter but long or deep in length, then a medium, such as air, present in the depressions considerably hampers the acceptance or takeup of ink, because the ink introduced into the depressions via the openings thereto prevents the emergence of the air from the depressions, due to which the space for the acceptance or takeup of the ink becomes relatively small.

A remedy is provided herein by the so-called suction printing process, wherein the medium in the depressions serves specifically and selectively for each depression for accepting or taking up the ink. In this regard, use is made of the fact that the volume of the air present as the medium in the depressions depends to a very great extent upon the temperature. If, therefore, the air in the depressions is heated before the ink is accepted or taken up, then the ink will be driven correspondingly forcefully out of the depressions. If the entrance to the depressions is then closed by the ink and the remainder of the medium present in the depressions is cooled, the medium will then contract with the cooling and, accordingly, suck ink into the depressions. This effect is greater, the greater the fluctuation of the temperature in the depressions. In practical terms, if previous high heating occurs in a depression and a high level of cooling of the medium takes place in a respective depression while the ink is being supplied, a comparatively large amount of ink will be sucked into the respective depression. Therefore, principally by controlling the temperature in the depressions, the quantity of ink accepted or taken up in the depressions can also be controlled. The printing form in the suction printing process is therefore rewritten with the aid of a thermal image before each new printing operation, for example, the depressions are irradiated selectively with energetic radiation. It is therefore possible for even very small editions to be printed cost-effectively. By optional additional heating of the depression during the transfer of the ink to the printing medium to be printed, the ink remaining in the depression can also be expelled specifically, so that the heating step has two functions, namely making ready the acceptance or takeup of ink for the next step and, at the same time, ensuring the expulsion of the ink from the depression.

Whereas, in the suction printing process according to the hereinaforementioned International Publication No. WO 00/40423 and also in the case of the hereinaforedescribed process, the image on the printing form can theoretically always change from printing operation to printing operation, this is not the case in the gravure printing process further known from the literature wherein a reusable printing form is employed. This process, amongst others, is described in the Handbook of Print Media by Helmut Kipphan (Springer-Verlag on pages 677, 678). In this heretofore known process, a form cylinder formed uniformly with depressions is provided, whereon the depressions are distributed in the form of a matrix. The depressions, referred to as cells, have a high density in relation to one another, it being possible for about seventy cells to lie on a square centimeter. Before the printing operation, the depressions are filled with a polymer, after which a uniform surface with exposed metallic lands or cross-pieces is produced with a doctor blade. This polymer in the cells is then hardened. The setting of an image or imaging then takes place by vaporizing the polymer in the cells, if necessary or desirable, wholly or only to some extent, by a thermal laser. Consequently, within the predefined or prescribed structure of the cells, individual depressions with different spatial or three-dimensional volumes are formed. The volumes exposed by the laser beam can differ from one another both in the diameter and in the depth thereof, by which a plurality of gray values per pixel can be produced, which permits a correspondingly higher colored or printed image quality.

After a print run or after printing an edition, the printing form is erased by a water jet under high pressure, by which the polymer is released from the cells. The heretoforeknown process is suitable both for direct gravure printing and for indirect gravure printing, wherein the printing image is transferred to paper webs via a transfer cylinder with a rubber coating.

It has been found that the suction printing process has considerable advantages over the other hereinaforedescribed processes. In the suction printing process, assurance is provided that the ink will be introduced in the desired quantity into the depressions. In addition, in this suction printing process, it is possible, by modifying the surfaces of the printing form located between the depressions, to make these surfaces ink-repellant, so that the result here is a printing process which makes use of the advantages of both gravure printing and of offset printing. One difficulty with the suction printing process, however, is that the depressions, preferably arranged in the form of a matrix, must have a considerable depth in comparison with the cross-sectional dimensions thereof. In addition, care must be taken to ensure that the medium in the depressions can be rapidly heated and cooled, respectively.

SUMMARY OF THE INVENTION

It is accordingly an object of the invention to provide a process for producing a printing form that is suitable for suction printing, and to provide a printing form which is constructed especially suitable for suction printing.

With the foregoing and other objects in view, there is therefore provided, in accordance with one aspect of the invention, a process for producing a printing form, which comprises forming a multiplicity of blind holes opening into a surface of a spatial or three-dimensional structure of the printing form, the blind holes serving for receiving a medium therein, and providing a propellant in the printing form for assisting in expelling the medium from the blind holes.

In accordance with another mode, the process of the invention further comprises providing as starting material for the spatial structure, a semifinished product having an ink-repellant property at the surface thereof, and providing an embossing mold for embossing the blind holes in the semifinished product.

In accordance with a further mode, the process of the invention further comprises providing an injection mold which takes the blind holes into account, filling the mold with a substance selected from the group thereof consisting of a heated powder, a heated granulate, and a powder mixed with a binder, for molding the printing form, and opening the mold for releasing the thus molded printing form therefrom.

In accordance with an added mode, the process of the invention further comprises one of the steps of sintering and hardening the thus molded printing form.

In accordance with an additional mode, the process of the invention further comprises selecting the powder and granulate, respectively, so that the printing form has an ink-repellant property at the surface thereof.

In accordance with yet another mode, the process of the invention further comprises, during insertion of the blind holes in the printing form, performing at least one of the steps of avoiding placement of the embossing mold with the surface thereof on the surface of the printing form located between the blind holes, and cleaning the surface of the printing form after the embossing.

In accordance with yet a further mode, the process of the invention further comprises providing a casting mold for casting the printing form, only partly filling the casting mold with casting compound, and subsequently filling the casting mold with a coating having ink-repellant properties.

In accordance with yet an added mode, the process of the invention further comprises providing the propellant in the form of an absorber layer heatable by electromagnetic radiation.

In accordance with yet an additional mode, the process of the invention further comprises applying the absorber layer over the entire surface of the printing form provided with blind holes, including the inner surface of the blind holes, and then cleaning at least the area of the printing form surrounding the blind holes so as to remove the absorber layer therefrom.

In accordance with still another mode, the process of the invention further comprises placing on the surface of the printing form, which is provided with the blind holes, a mask which covers the area located between the blind holes, and then coating the inner surface of the blind holes with the absorber layer, at least in a lower portion of the blind holes.

In accordance with still a further mode, the process of the invention further comprises, at one of the stages, respectively, before and after embossing the blind holes, coating the embossing mold with an absorber layer on protrusions thereof provided for embossing the blind holes, and then lowering the protrusions of the embossing mold into the material of the printing form and the already embossed blind holes, respectively, and depositing the absorber layer on the inner surface of the blind holes.

In accordance with still an added mode, the process of the invention further comprises hardening the absorber layer after it has been applied to the inner surface of the blind holes.

In accordance with still an additional mode, the process of the invention further comprises producing the printing form from a semifinished product, and applying the absorber layer to the entire area of the surface of the semifinished product before the embossing step.

In accordance with another mode, the process of the invention further comprises producing the printing form from a semifinished product, applying the absorber layer to the entire area of the surface of the semifinished product before the embossing step, and then structuring the applied absorber layer by chemical processes in subareas assigned to the individual blind holes.

In accordance with a further mode, the process of the invention further comprises producing the printing form from a semifinished product and, before the embossing step, applying the absorber layer to the surface of the semifinished product by a mask in subareas assigned to the individual blind holes.

In accordance with an added mode, the process of the invention further comprises producing the printing form from a semifinished product and, before the embossing step, applying the absorber layer to the surface of the semifinished product in a structured manner by a printing operation in subareas assigned to the individual blind holes.

In accordance with an additional mode, the process of the invention further comprises placing, on subareas assigned to the individual blind holes, the protrusions of the embossing mold serving for inserting the blind holes into the printing form, and then pressing the protrusions into the printing form in order to form the blind holes, thereby depositing the absorber layer situated on the subareas in a bottom portion of the blind holes.

In accordance with yet another mode, the process of the invention further comprises cleaning areal regions of the surface of the printing form located between the blind holes, after the blind holes have been formed.

In accordance with yet a further mode, the process of the invention further comprises assembling the printing form from a first partial form and a second partial form.

In accordance with yet an added mode, the process of the invention further comprises providing the first partial form as a first substrate, and the second partial form as an uncoated second substrate, placing the partial forms above one another, and via an embossing mold, inserting the blind holes into the partial forms so that the blind holes reach at least as far as the second partial form.

In accordance with yet an additional mode, the process of the invention further comprises separating the first partial form from the second partial form by lateral displacement, and then coating the second partial form by an absorber layer in subareas assigned to the blind holes.

In accordance with still another mode, the process of the invention further comprises performing a step selected from the group thereof consisting of coating the subareas with a mask, coating the protrusions of the embossing mold serving to form the blind holes at the end faces thereof and sinking this coating into the respective holes in the second partial form, and coating the subareas by a printing operation.

In accordance with still a further mode, the process of the invention further comprises, after coating the second partial form, aligning the two substrates again with respect to one another so that the holes in the first partial form are aligned with a feature selected from the group consisting of the coating of the second partial form, and the holes in the second partial form.

In accordance with still an added mode, the process of the invention further comprises nonreleasably connecting the first partial form and the second partial form to one another by a step selected from the group thereof consisting of welding and adhesively bonding.

In accordance with still an additional mode, the process of the invention further comprises forming the second partial form from an uncoated second substrate; by an embossing mold, inserting the blind holes into the two partial forms, which are disposed above one another, so that the blind holes extend at least as far as the second partial form; and by the embossing mold, sinking a layer of absorber material located in the portion of the holes in the second partial form into the appertaining holes.

In accordance with another mode, the process of the invention further comprises hardening at least the layer of the absorber within the blind holes after opening the mold and removing therefrom the printing form which has been produced.

In accordance with a further aspect of the invention, there is provided a printing form, comprising a three-dimensional or spatial structure having a surface at which a multiplicity of blind holes open into the printing form, a propellant disposed within the blind holes for permitting a temperature change in at least one medium located within the blind holes, the three-dimensional structure being at least one molding formed of a semifinished product having an ink-repellant surface.

In accordance with an added aspect of the invention, there is provided a printing form, comprising a spatial or three-dimensional structure having a surface at which a multiplicity of blind holes open into the printing form, a propellant disposed within the blind holes for permitting a temperature change in at least one medium located within the blind holes, the three-dimensional or spatial structure being an assembly of a first and a second partial form, the first partial form being formed with through holes which, at ends thereof facing towards the second partial form, meet subareas provided with absorber material.

In accordance with another feature of the invention, the through holes formed in the first partial form are aligned with holes formed in the second partial form.

In accordance with a further feature of the invention, the first and the second partial forms are united integrally with one another by a method selected from the group thereof consisting of adhesive bonding and welding.

In accordance with an added feature of the invention, the printing form further comprises an absorber layer provided in a bottom portion of the blind holes, the blind holes extending through the first partial form to at least as far as the surface of the second partial form.

In accordance with another mode, the process of the invention includes depositing the absorber layer on the inner surface of the blind holes particularly on a bottom portion of the inner surface.

In accordance with a concomitant mode, the process of the invention further comprises providing the first partial form as a first substrate, and the second partial form as an uncoated second substrate, placing the partial forms above one another, and via an embossing mold, inserting the blind holes into the partial forms so that the blind holes reach into the second partial form.

The invention, in principle, calls for selecting a starting material, providing blind holes or other holes in this material and providing a propellant that assists in the expulsion of a medium from the blind holes. In addition, the surface of the printing form not covered by blind holes can be provided with an ink-repellant property, in particular with an ink-repellant coating. However, the process according to the invention is also suitable for printing forms which are operated in the so-called suction printing process, but wherein the area located between the depressions is freed of ink by a doctor blade instead of having the aforementioned areas kept free of ink by an ink-repellant surface. In one embodiment of the invention, the propellants are introduced into the bottom portion of the depressions, i.e., at a time at which the depressions are completely or at least partly completed within the printing form. It is therefore advantageous for the individual propellants assigned to the respective depressions not to be cast with the printing form but to be introduced into the depressions or connected to the depressions. In this regard, the depressions can already be fully completed three-dimensionally or can also be present only to a limited extent.

In order to configure the effectiveness of the forces caused by the temperature changes to be as beneficial as possible in relation to the printing process, according to the invention, a so-called propellant is introduced into the bottom portion of the depressions, which are closed at the lower end thereof, these closed depressions being referred to hereinbelow as blind holes.

The areas of the surface of the printing form located between the blind holes are preferably ink-repellant. In this case, this area does not take up or accept any ink, and it is possible to dispense with the removal of ink with the aid of a doctor blade. For such a case, it is recommended that the starting material to be used be a semifinished product which has an ink-repellant property at the surface thereof. The advantage is that the starting material already has the desired properties with regard to the surface, so that those properties do not have to be added subsequently.

In a further improvement of the invention, the surface can be produced by providing an injection mold that takes the blind holes into account. In principle, a negative of the printing form is therefore created, which is then filled with casting compound. The casting compound preferably used is a powder or granulate formed of plastic material, which is preferably a polycarbonate. In order to make opening of the mold and removal of the molded printing form, i.e., demolding, easier, the blind holes are preferably configured so that they widen conically toward the opening thereof.

Because the printing form is intended to be used repeatedly, in a further development of the invention, it is recommended that the casting or injection-molded form be hardened or sintered. The hardening of the form is also advantageous for subsequent processing thereof, wherein, for example, the heating agents are introduced into the blind holes. If the introduction is carried out mechanically, assurance must be provided that the blind holes are not damaged thereby.

If a casting process is chosen for the production of the printing form, and if the surface of the cast printing form is to have ink-repellant properties, it is then even recommended to select the casting material so that the printing form is ink-repellant at the surface thereof.

If the blind holes are embossed into the starting material of the printing form by an embossing mold, it is possible then that the surface of the starting material and therefore of the printing form may be damaged or soiled by the embossing mold.

In this case, in a further development of the invention, it is recommended to construct the protrusions of the embossing mold, which emboss the blind holes, longer than the depth of the blind holes. The protrusions therefore reach a desired depth of the blind holes in the starting material without placing the surface of the embossing mold, from which these protrusions originate, on the surface of the starting material. Selectively or additionally, soiling of the surface of the printing form-can be eliminated by an appropriate cleaning operation.

If the printing form is produced by casting, assurance should be provided that the surface of the printing form is not soiled by the casting operation. Another necessity may be for the printing form to be produced in two layers in two successive casting operations. This can be the case, for example, when the lower, first layer has the necessary hardness while the thinner, second layer lying thereabove has the desired ink-repellant properties. In both cases, the casting mold can also be filled only partly with the casting compound and then filled with a coating having ink-repellant properties. Subsequent embossing of the blind holes will generally not be necessary after the casting, because the blind holes are already integrally molded into the printing form after the casting. Likewise, however, there is a possibility that the blind holes are also embossed completely into the cast printing form or are at least corrected by an embossing mold.

Electromagnetic radiation can be used for heating the blind holes locally, and an absorber layer serving as a propellant can be inserted into the blind holes and heated by the radiation.

According to an advantageous further development of the invention, a proposal is made to provide the blind holes first in the printing form and then to apply the absorber layer over the entire printing form prepared in this way. This can be effected by a conventional chemical or physical coating process. Because the heating is to take place only within the blind holes, the absorber layer on the surface of the printing form between the blind holes can also be removed. This is advantageous, in particular, when the laser focus has a great depth, or the absorber layer does not have the desired surface property. Furthermore, during this operation, the absorber layer present in the upper portion of the outer surface of the blind holes can also be removed. This can be effected, for example, by a modified embossing tool, which cleans the walls of the blind holes in the upper portion.

If one wishes to shorten or completely avoid the cleaning operation described last herein, it is then recommended, in a further development of the invention, that a mask be placed onto the surface of the printing form provided with blind holes, the mask serving to cover the areas between the holes. This process is advantageous, in particular, when the surface of the printing form already has ink-repellant properties and can therefore be covered by the mask. The mask can comprise a film laid mechanically onto the surface of the printing form or else a layer applied chemically or physically, whereon the areas to be coated with the absorber layer are exposed chemically or physically.

By a modified process step, the application of the absorber layer in the bottom portion of the blind holes can be simplified considerably. This process step calls for, in principle, the use of the embossing mold to introduce the absorber layer into the blind holes, as well. In this regard, the embossing mold can be used in a first step for embossing the blind holes into the starting material of the printing form, after which, in a second step, the embossing mold introduces the absorber layer into the bottom portion of the blind holes. Care must be taken in this case to ensure that the absorber areas carried into the blind holes by the tips of the embossing mold remain adhering to the bottom of the blind holes and therefore can be removed comparatively easily from the tips of the protrusions on the embossing mold. This is achieved by the embossing mold being relatively hard and firm and being less or more poorly wetted by the absorber material than the bottom of the blind holes, while the material in the bottom portion of the blind holes is easily wetted by the material of the absorption layer. Hardening of the material of the printing form can be carried out in a subsequent step, as has already been described further hereinabove.

There is also the possibility, however, of introducing the absorber layer into the blind holes by the actual embossing operation. The embossing mold thus penetrates into the starting material of the printing form, the tips of the protrusions of the embossing mold carrying the absorber areas which are deposited on the bottom of the blind holes to be embossed. For this purpose, it is necessary that the absorber layer not be destroyed during the embossing operation. Care must then be taken to ensure that the absorber layer is comparatively hard and/or firm, while the starting material for the printing form must be compliant or yielding, in order that the forces exerted on the tips of the protrusions during the embossing operation do not become too high, and consequently destroy the absorber areas. Furthermore, the absorber material may also be liquid, however. In this second case, however, the liquid ought not to be miscible with the material to be embossed.

According to a further development of the invention, care must be taken that the absorber layer in the blind holes have the necessary strength. In this regard, the resistance capability necessary for the absorber layer may be achieved by subsequent hardening.

In order to be able to introduce the absorber areas into the blind holes by the embossing mold, the individual absorber areas have to be formed first. For this purpose, for example, the entire surface of the printing form can be covered with the absorber layer. Thereafter, due to the embossing and the embossing mold, respectively, the absorber areas located above the blind holes are introduced into the blind holes. The portion of the absorber layer located between the blind holes must be removed subsequently, if necessary or desirable.

Another possibility is to remove the absorber areas located between the blind holes, preferably chemically or physically, before embossing the blind holes. Then, only the absorber areas still remain above the blind holes to be formed, and are introduced into the blind holes by the embossing mold.

The necessary absorber areas can be produced with the aid of a coating by a mask, which is placed upon the surface of the printing form and which is formed with cutouts corresponding to the absorber areas.

A further possible way of applying the absorber areas to the surface of the printing form before the blind holes are embossed is achieved by applying the absorber areas to the possibly ink-repellant surface of the printing form by a printing process. The absorber areas are then introduced into the blind holes by the subsequent embossing.

A very simple and effective method of introducing the absorber area into the blind holes is by placing the embossing mold with the protrusions thereof on the surface of the semifinished product or on the surface of the future printing form, respectively, a respective protrusion on the embossing mold being assigned to the individual absorber areas. Due to the embossing operation, the absorber areas are then pressed into the semifinished product and, in this regard, the blind holes are formed simultaneously. Simultaneously with the embossing, the absorber layer is transferred to the bottom of the blind holes, for example, due to splitting of the layer applied to the embossing mold. The hardening of the printing form and/or the hardening of the absorber areas can then take place.

If the bottom of the embossing mold is placed on the surface of the printing form during the embossing of the blind holes, then, in a further development of the invention, it is recommended that this surface be cleaned. Placing the embossing mold on the printing form can have the advantage of reshaping the surface of the printing form in this way, and possibly changing the surface roughness thereof. This may be necessary due to the fact that the edge around the opening of the blind holes is thrown up by the embossing of the blind holes, so that by the last described process step, the surface around the edges of the blind holes can be reshaped and the surface roughness thereof can possibly be changed However, the action of throwing up the edge of the blind holes can also be used specifically in order to affect the wetting behavior of the printing form with respect to the ink between the blind holes.

In order to produce an optimum printed image, as many blind holes as possible per square centimeter should be arranged in matrix form on the printing form. Furthermore, the number of possible gray stages and the possible contrast of the printed image depend upon the possible range of variation of the quantity of ink that can be brought forth from the blind holes. In other words, the printed image may be improved by the blind holes being relatively deep and lying closely beside one another. It is therefore particularly advantageous to assemble the printing form from a plurality of parts. This results in considerable advantages in shaping the blind holes, but care must be taken that the printing form formed of a plurality of partial forms should also be aligned accurately with regard to the partial forms. It is therefore necessary to ensure that the individual sections of the blind holes within the individual partial forms are aligned with one another when the partial forms are assembled lying above one another.

There are two possible ways of shaping the blind holes from the combination of the two partial forms. One possible way is to introduce the blind holes into the upper one of the two partial forms in the form of through holes and then to close the lower opening of the through holes by the second partial form, so that the blind holes are formed in this way.

The other possible way calls for, in principle, introducing sections of the blind holes into the partial forms in two separate steps and then aligning the sections of the blind holes with one another. The lower partial form or, in the case of more than two partial forms, the lowest partial form has no through holes but only holes which are closed at the lower ends thereof, or the lowest partial form closes only the through holes of the partial form lying thereabove.

Although the printing form can be assembled from two partial forms, it is possible, within the scope of the invention, to use more than two partial forms lying above one another. The second partial form can be built up from an uncoated substrate which, accordingly, does not regularly have its own absorber layer. For the improvement proposed here, it is essential that, in the case of very deep blind holes, the latter can be assembled from a plurality of aligned through holes, the lowest of the partial forms bearing the individual sections of the through holes closing the through holes aligned therewith and lying thereabove. In this regard, the individual through holes can be embossed after one another with the same embossing mold. With regard to the lowest partial form, this also applies to the cutouts closed at the bottom.

Assembling the printing form from a plurality of partial forms lying above one another can also make it easier to introduce the absorber layer into the lower bottom portion of the respective blind hole. It is possible, in this regard, to introduce the individual sections of a blind hole into the partial forms lying above one another, in a single operation and then, in a further operation, to separate the partial forms from one another in order, in a third operation with the embossing mold, to provide the bottom of the blind hole, arranged within the lowest partial form, with the absorber layer in a straightforward manner. In this regard, the coating can again be performed in a manner that the tips of the protrusions of the embossing mold are provided with the absorber areas and these tips are then lowered into the corresponding cutouts formed in the lowest partial form and deposited therein. In this regard, the embossing mold can extend through all of the partial forms or engage only in the openings in the third partial form.

Furthermore, the subareas can be formed in accordance with the aforedescribed process steps, as has already been described in connection with an integral printing form. These process steps are preferably applied to the lowest partial form in an analogous manner. Thus, the subareas are again applied to the surface of the lowest, second partial form through a mask, by printing through the intermediary of the embossing mold or by a separate printing operation, and then the thus formed subareas can, if necessary or desirable, be sunk into cutouts in the lowest partial form. The sinking can again be performed by the embossing mold. However, there is also the possibility of leaving the subareas formed in this way in place on the surface of the lowest partial form and, via the lower partial form, of closing the through holes in the partial forms lying above, so that the necessary blind holes are formed in this manner. It is believed to be readily apparent that the subareas on the lowest partial form and the hole sections of one or more upper partial forms lying thereabove must be aligned with one another.

In order to obtain a desired coherent printing form, it is recommended, in a further development of the process, to join the first and the second part form nondetachably or nonreleasably to one another. Within the scope of the invention, it is also possible to make the surface of the lowest partial form adhesive by an appropriate whole-area layer of adhesive or by heating and laying the absorber areas on the adhesive layer formed in this way and, immediately thereafter or at the same time, to join the overlying partial form to the lowest partial form.

In an advantageous further development of the process, there is a possibility of applying the actions for the insertion of the absorber layer, as described further hereinabove in connection with the integral printing form, also with regard to the lowest partial form. In this regard, the subareas of the absorber layer can be sunk to the bottom of the blind hole by the embossing mold through the aligned sections of a plurality of through holes lying above one another. However, it is also possible to apply the hereinaforedescribed process steps only to the lowest partial form of the printing form.

Other features which are considered as characteristic for the invention are set forth in the appended claims.

Although the invention is illustrated and described herein as embodied in a printing form and a process for producing the printing form, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Hereinafter, individual possible process steps in the individual production stages are described. In this regard, the stages represent different ways of producing the printing form based upon the objective and the production equipment that is available, which can be selected for matching the respective requirements. It is also the case that the individual ways of producing the printing form which are available within a production stage do not define the possible ways in a following production stage. For example, within production stage B, a material can be chosen which already has the necessary surface properties while, in a production stage C, various ways in the application of the absorber layer can be followed as desired. For each of the production stages illustrated, a letter provides an identification, the individual possible steps within a production stage being numbered consecutively.

A: Creation of the Three-Dimensional Structure

Figure 1:
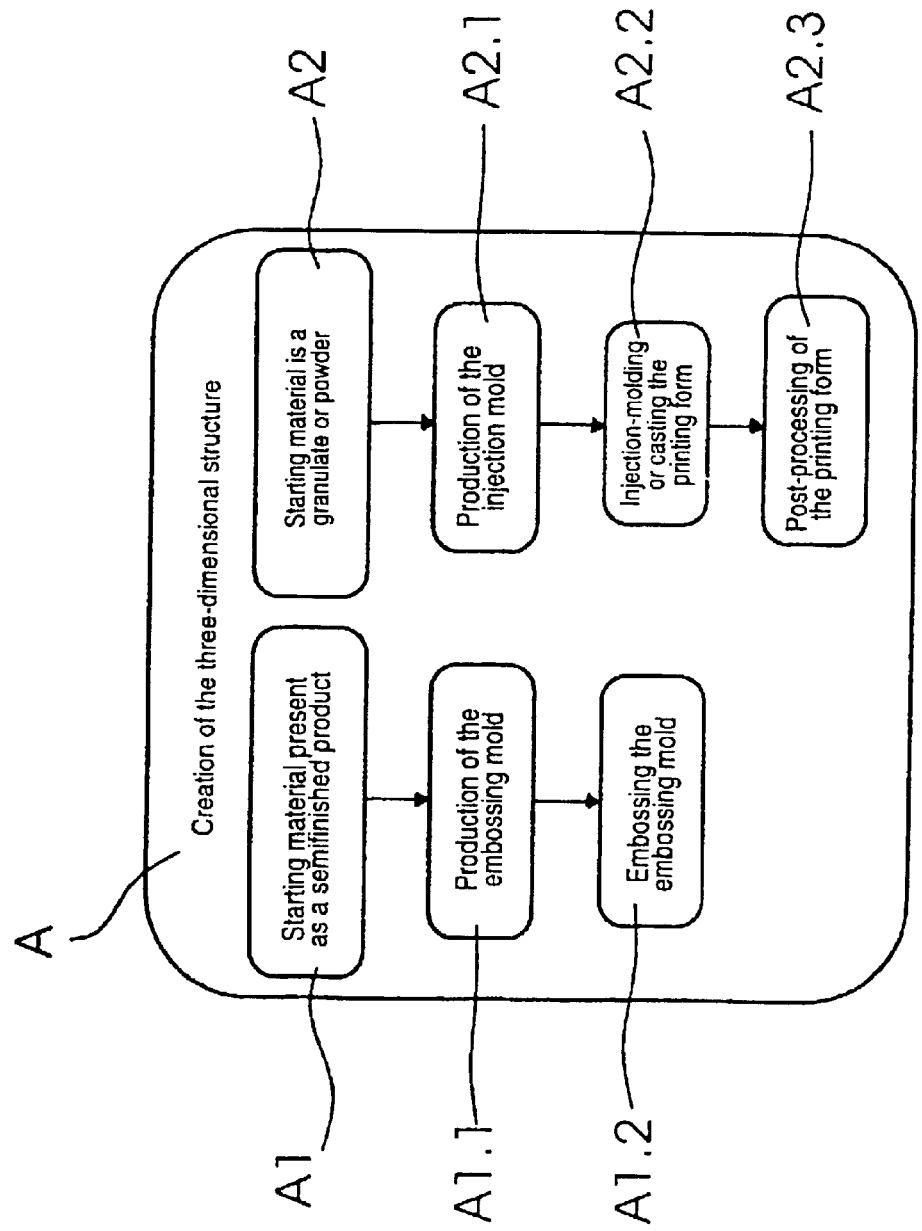
FIG. 1 is a flow chart depicting advantageous process steps in the production of the spatial or three-dimensional structure of the printing form according to the invention.

As shown in FIG. 1, the starting material can be present as a semifinished product A1 or a granulate A2. The process steps which are further required are divided up appropriately:

A1 Starting Material Present as a Semifinished Product

The starting material for the printing form is present as a thin plate, sheet, roll or sleeve in pure form or on a substrate.

A1.1 Production of the Embossing Mold

With a low-cost LIGA process from Microsystem Engineering, for example, by using special photoresists and subsequent reshaping by electroplating, an embossing mold can be produced which contains the desired depressions with a high aspect ratio in the form of a negative. In the case of a sleeve-like starting material for the printing form to be embossed, the depressions can be located, for example, on the outer or inner side of a cylindrical or sleeve-like embossing mold.

A1.2: Embossing the Embossing Mold

The embossing of the desired structure into the starting material for the printing form to be produced is then carried out under pressure and heat.

If this starting material is present in the form of a plate or film, then the embossing operation can be carried out in one of the following ways:

a) pressing in a flat embossing plate,
b) rolling on an embossing cylinder, which carries the negative of the desired structure on the outer side.

If the starting material is present in the form of a roll or sleeve, then the embossing operation can be carried out in one of the following ways:

c) rolling the starting form (roll or sleeve) to be embossed on a flat embossing plate
d) rolling the starting form (roll or sleeve) to be embossed on an embossing cylinder, which carries the negative of the desired structure on the outer side,
e) sheathing the starting form (roll or sleeve) to be embossed by slipping over and cooling a heated embossing sleeve, which carries the negative of the desired structure on the inner side.

A2: Starting Material is a Granulate or Powder:

The starting material for the printing form is suitable for film casting or injection molding and is present as a granulate or powder.

A2.1: Production of the Injection Mold:

Using a low-cost LIGA process from Microsystem Engineering, for example, by using special photoresists and subsequent reshaping by electroplating, a mold insert can be produced which contains the desired depressions with a high aspect ratio in the form of a negative.

A2.2: Injection-Molding or Casting the Printing Form

The starting material for the printing form to be produced is either melted or slurried in a binder and cast or pressed into the mold insert with the aid of a film casting or injection-molding machine. After the material has become solid as a result of cooling or expelling the binder (possibly also sintering), demolding or opening the mold and removing the molded printing form can be carried out.

A2.3: Post-Processing of the Printing Form

After demolding, an additional sintering or hardening step may follow.

B: Production of the Surface Properties of the Form

Figure 2:
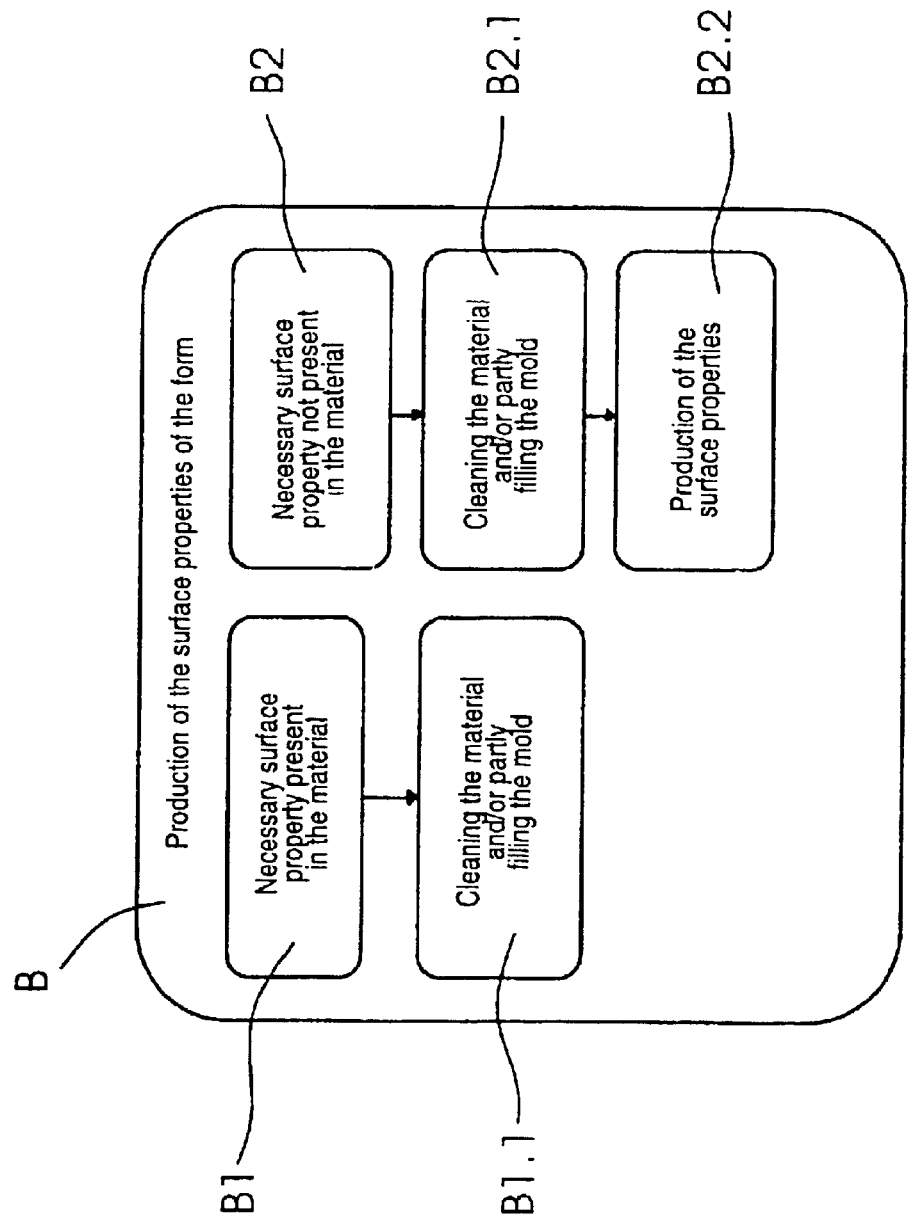
FIG. 2 is a flow chart depicting advantageous process steps in the production of the properties of the surface of the printing form.

The production of the surface structure is illustrated diagrammatically in FIG. 2. Here, a distinction has to be drawn as to whether the necessary surface property already present in the material is B1 or not B2.

B1: Necessary Surface Property Present in the Material

The material from which the printing form is produced already has the necessary surface properties.

B1.1: Cleaning the Material and/or Partly Filling the Mold

Any soiling or residues of coatings on the surface of the embossed or injection-molded printing form can be removed by mechanical-chemical, wet chemical, ultrasound-assisted, plasma-assisted or ablative cleaning processes.

As an alternative or as a supplement to the aforementioned possibilities, both in the case of hot embossing and in the case of injection molding, the depressions in the negative in the embossing tool or mold insert can be lengthened to such an extent that the embossed or injection-molded compound does not reach the bottom of the depression or does not come into contact therewith. In this way, the front side of the printing form produced remains uncontaminated and maintains the surface property of the basic material. The lands between the depressions in the printing form in this case are given a slightly curved surface.

B2: Necessary Surface Property not Present in the Material

The material from which the printing form is produced does not have the necessary surface properties. In this case, after cleaning, a corresponding coating or surface treatment (e.g., plasma) of the printing form with a low-energy layer is necessary. Depending upon the choice of the processes applied for printing form production and coating/treatment, the coating/treatment of the printing form is preferably carried out following a specific step in the production process, in order to ensure compatibility between production and coating/treatment processes.

B2.1: Cleaning the Material and/or Partly Filling the Mold

Here, the processes known to the average person skilled in the art are available.

B2.2: Production of the Surface Properties

Here, the processes known to the average person skilled in the art are available, such as microstructuring and/or nanostructuring of the surface, for example.

C: Application of the Absorber Layer

Figure 3:
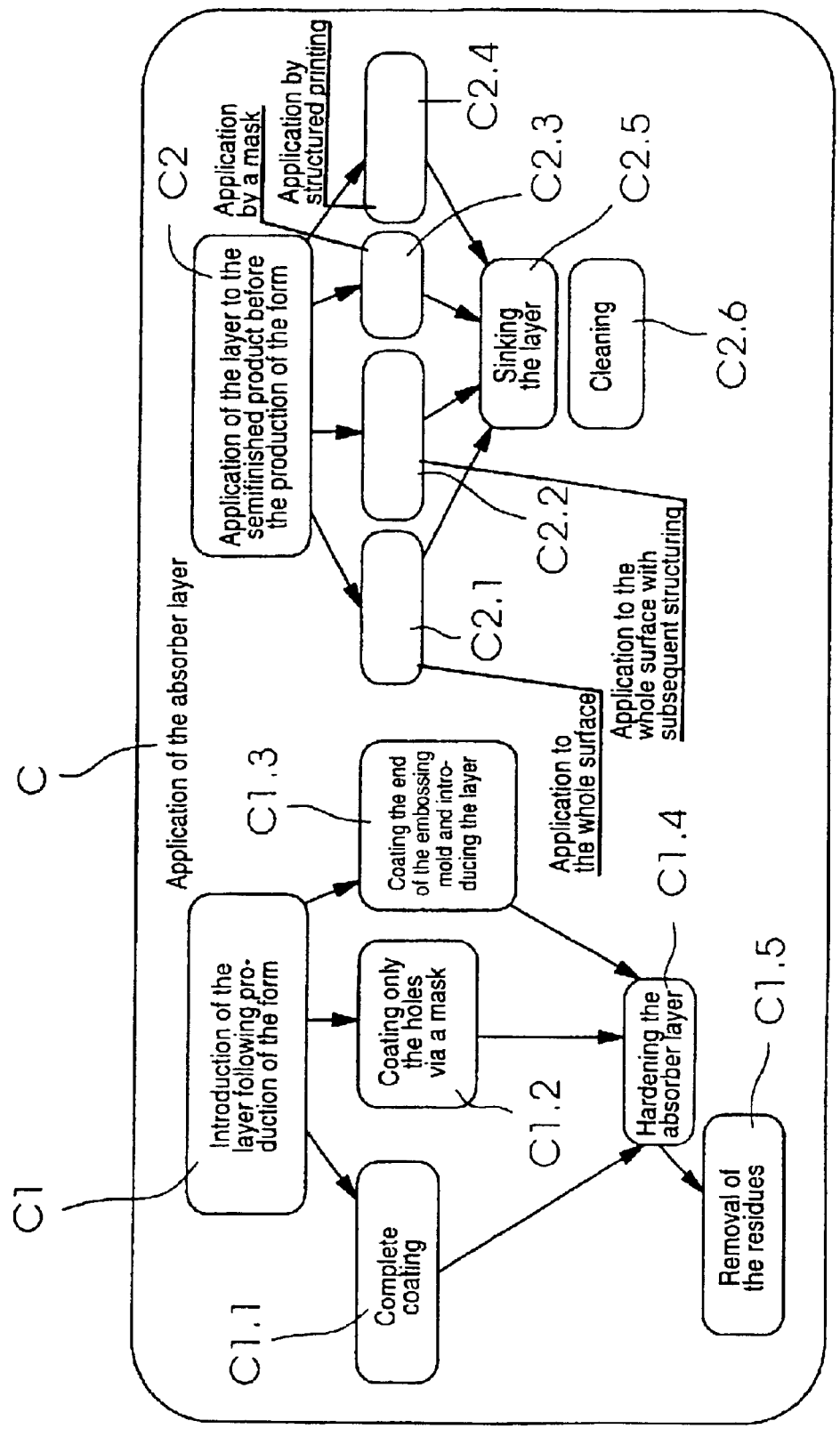
FIG. 3 is a flow chart depicting advantageous process steps in the application of an absorber layer in the printing form.
Figure 4:
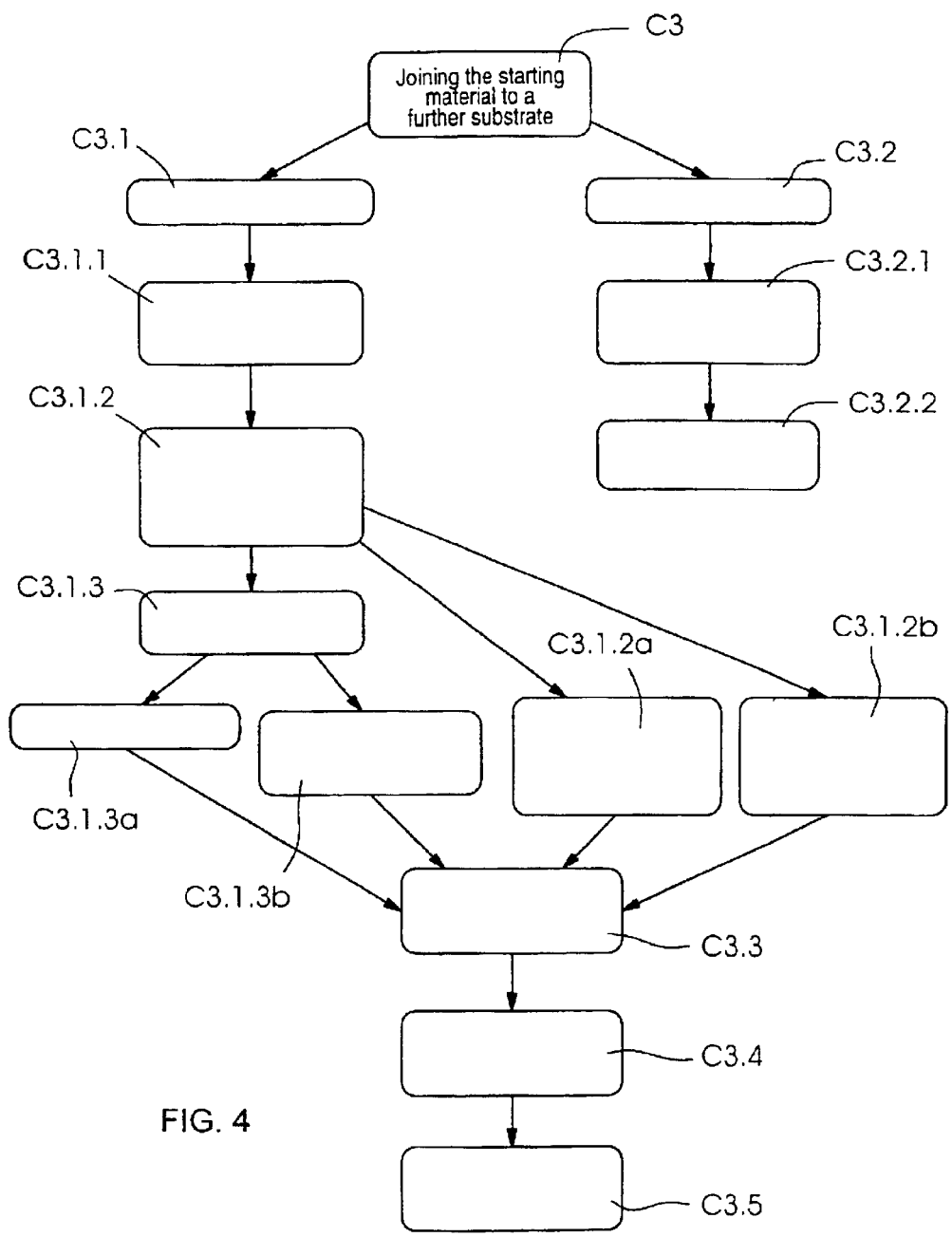
FIG. 4 is a flow chart depicting advantageous process steps in the production of the printing form from two partial forms.

As already explained hereinbefore, it is necessary to provide a propellant in the printing form, which assists the expulsion of the medium from the blind holes. For this purpose, an absorber layer is preferably introduced at least locally into the printing form. The process steps which are possible here are explained in conjunction with FIG. 3.

In combination with the process steps mentioned hereinabove, these can result in different overall process sequences:

C1: Introduction of the Layer Following Production of the Form

C1.1: Complete Coating a) The printing form to be produced is completed in accordance with one of the processes described hereinabove and then coated as a whole with the provided absorber layer or C1.2: Coating Only the Holes via a Mask b) The printing form to be produced is completed in accordance with one of the processes described hereinabove and fitted with a mask which covers the areas between the depressions. Coating with the absorber layer is then carried out, preferably by an anisotropic coating process or C1.3: Coating the End of the Embossing Mold and Introducing the Layer c) The printing form to be produced is completed in accordance with one of the processes described hereinabove and the application of the absorber layer in liquid/powder form is then carried out (for example, by rolling on) on the end of the elevations in the embossing mold. The embossing mold is then introduced again into the depressions in the previously embossed printing form in order to press the absorber layer onto the bottom of these depressions.

C1.4: Hardening the Absorber Layer

For all of the cases a) to c) listed in step C1, after demolding, there will be an absorber layer at the bottom of the embossed depressions, and this may still have to be dried or hardened.

C1.5: Removal of the Residues

If procedure a) was chosen in step C1, then the absorber layer is not only on the bottom of the depressions in the printing form that is produced but also on the surface of the lands between the depressions. For the case wherein the absorber layer does not have the surface properties necessary for the suction printing process in the solid state, the layer can subsequently be removed (for example mechanically/chemically, wet chemically).

C2: Application of the Layer to the Semifinished Product Before the Production of the Form C2.1: Application to the Whole Surface a) Coating the whole surface of the basic material to be embossed with the absorber layer or C2.2: Application to the Whole Surface With Subsequent Structuring b) As a) but subsequent subtractive structuring of the absorber layer or C2.3: Application by a Mask c) Structured coating of the basic material to be embossed with the absorber layer (coat through a mask/or screen printing through a stencil/or print with a master) or C2.4: Application by Structured Printing d) Application of the absorber layer in liquid/powder form (for example by rolling on) to the end of the elevations in the embossing mold. The surface of this end is chosen so that it preferably exhibits poorer wetting with the liquid/powdery absorber layer than the basic material of the printing form to be produced.

C2.5: Sinking the Layer e) Embossing the depressions into the printing form to be produced by the embossing mold. If procedure b) or c) was chosen in step 1, then the embossing mold must be aligned relative to the structured absorber layer. For all the cases a) to d) listed in step 1, after demolding, there will be an absorber layer at the bottom of the embossed depressions, which may still have to be dried or hardened.

C2.6: Cleaning

If procedure a) were chosen in step C1, then the absorber layer would be found not only on the bottom of the depressions of the produced printing form but also on the surface of the lands between the depressions. For the case wherein the absorber layer does not have the surface properties needed for the suction printing process when in the solid state, the layer can subsequently be removed (for example, mechanically/chemically, wet chemically) or, alternatively, can be provided with the necessary surface properties by a coating/treatment.

C3: Joining the Starting Material to a Further Substrate:

The starting material for the printing form to be produced is joined to a substrate which has a higher viscosity than the starting material:

C3.2

Before being joined to the starting material, the substrate has been provided with an absorber layer which is now located between the substrate and the starting material.

C3.2.1/C3.1.1

The embossing of the desired depressions is carried out beyond the layer thickness of the starting material, slightly into the substrate.

C3.2.2

If procedure b) was chosen in step 1, the final demolding is then carried out and the absorber layer is located both at the bottom of the embossed depressions and in the joining layer between the substrate and the starting material.

C3.1

The substrate has not been coated before being joined to the starting material

C3.1.2

If procedure a) was chosen in step C1, then during the demolding, the end of the embossing mold is then guided back only until it is located at the height of the interface between the starting material and the substrate. It is then moved laterally in order to bring about a separation of the completely embossed-through starting material from the substrate.

C3.1.2

The embossing mold carrying the starting material embossed through is then moved laterally back into the starting position again and pressed completely into the embossed-through starting material again.

C3.1.3

Then, the embossing mold carrying the starting material is pulled out of the substrate and the end of the embossing mold is coated with the absorber layer in liquid/powder form (for example, by rolling on). The surface of this end is chosen so that it preferably exhibits poorer wetting with the liquid absorber layer than the material onto which this absorber layer is to be printed.

C3.1.3a

Then, the embossing mold prepared in this way and carrying the embossed-through starting material is again aligned relative to the substrate and pressed into the slight depressions already existing. In this regard, the absorber layer is pressed onto the bottom of the slight depressions in the substrate.

C3.1.2a

In the case of the whole-area absorber layer, the embossing mold is preferably additionally pressed after placement.

C3.1.2b

In the case of the dot pattern, the embossing mold, either before or after placement, has to be aligned relative to the dot pattern of the film so that the elevations of the embossing mold are located on the dots.

C3.1.3b

As an alternative thereto, the embossing mold prepared with the liquid/powdery absorber layer and carrying the embossed-through starting material can be placed on a film/sleeve that is different from the original substrate, or can be pressed into it. In this regard, the absorber layer is transferred.

C3.1.3b (C3.1.2a)

If the embossing mold is only put in place, then the embossed-through starting material located in the embossing mold subsequently has to be pressed onto the film/sleeve in order to weld it to the latter.

C3.1.3b

The embossing mold carrying the embossed-through starting material is separated completely from the substrate and placed at the end on an already prepared second film or additionally pressed into the latter. This second film has been prepared either in accordance with one of the procedures described under process C, step 1, b) or c) and provided with an appropriate dot pattern of the absorber layer, or has been provided with an absorber layer over the entire area.

C3.3

The substrate and the embossed-through starting material can then be welded to one another (for example, by laser point welding, microwave welding or pressure/heat) or adhesively bonded. In the case of adhesive bonding, the surface of the substrate must previously be provided with an adhesive layer.

C3.3/C3.4

The welding or adhesive bonding operation and the subsequent demolding can then be carried out as described hereinabove under a).

C3.4

The final demolding is then carried out.

C3.5

For all the cases a) to d) listed in steps 1 to 3, after demolding, there will be an absorber layer at the bottom of the embossed depressions, which must still be dried or hardened, depending upon the particular case.

Two examples of an alternative process for the production of a printing form for the suction printing process are described hereinbelow.

For large and in particular for sleeve-like printing forms, it is technically difficult to implement these by the casting process. Should the blind holes be particularly deep and narrow, then a further difficulty is to insert these into the casting mold in a single operation. The two following examples show possible solutions here and describe a practicable and cost-effective process for the production of a printing form for suction printing. As already explained further hereinabove, the ink used for the suction printing process should not wet the surface of the printing form. Therefore, either the material of the printing form must have appropriate surface properties or it must be appropriately surface-treated or appropriately coated. Depending upon these different starting positions, a plurality of varying modes for a production process for such a printing form are provided.

EXAMPLE 1

Figure 5:
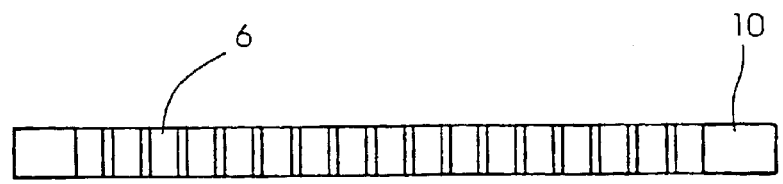
FIGS. 5 and 6 are respective side elevational views of upper and lower partial forms of a printing form to be assembled therefrom.
Figure 6:
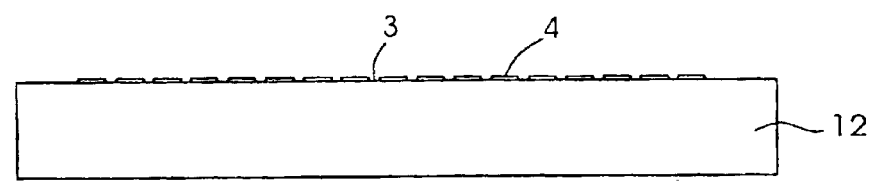
Figure 7:
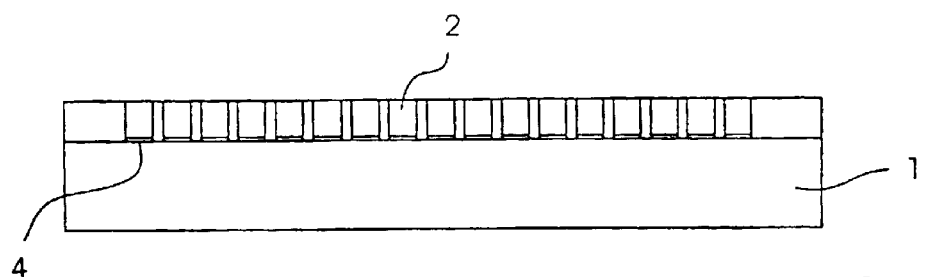
FIG. 7 is a side elevational view of the printing form for the suction printing process assembled from the partial forms according to FIGS. 5 and 6.

As shown in FIGS. 5 to 7, the blind hole structure of the printing form is produced by a plurality of preprocessed parts which are joined together. The printing form should therefore have the form of a hollow cylinder open on one side.

In this exemplary embodiment, the following starting situation is present (starting situation A). The material from which the printing form is produced already has the necessary surface properties (see process step B1 described hereinabove). The starting material for the printing form is present as a thin plate, film or sleeve (see process step A1 described hereinabove).

Step 1:

Using an ablation process (e.g., excimer laser, projection mask), a spark erosion process, an ultrasonic drilling process, an engraving process (gouge), an anisotropic etching process (e.g. photon-induced) or the exposure and subsequent development of photostructurable glass, continuous openings 6 can be produced in the plate, film or sleeve 10.

Step 2:

A second plate, film or sleeve 12, which does not necessarily consist of the same material, is covered on one side (the outer side) with the desired absorber material in areas 4, for example, printed in the form of a pattern corresponding to the openings produced in step 1 or coated in a structured way (for example, laser deposition, LCVD) or coated through an appropriate mask. The mask used can also be, for example, a plate, film or sleeve 10 produced by step 1. As an alternative thereto, printing or coating can also be carried out over the whole area and then the desired pattern can be produced by subtractive structuring, for example, by ablation in the areas 3.

Furthermore, it is also possible to structure the absorber material applied to the whole area by the simple application of the following step 3. In this regard, exact positioning can advantageously be dispensed with as the blind holes are only produced during this procedure by placing the parts processed in step 1 onto a continuous area with absorber material. In this regard, it is also unimportant whether the continuous absorber surface has been produced by coating or use has been made of a material which can intrinsically also serve as an absorber.

Step 3:

The part 10 processed in step 1 and the part 12 processed in step 2 are positioned relative to one another and joined to each other in such a way (for example, by welding, adhesive bonding) that the desired printing form is produced. In the case of sleeves, the part processed by step 1 is pushed over the part processed by step 2 and positioned. The joining of the two parts before permanent connection thereof can be assisted by temperature changes and the length changes in the material, which are associated therewith.

In the example described here, however, the specific configuration wherein the material from which the printing form is produced does not have the necessary surface properties may also be advantageous. The starting material for the printing form is accordingly present as a thin plate, film or sleeve (see process step A1 described hereinabove). In the case of this starting situation B, the procedure corresponds, in principle, to that in the starting situation A, but before being joined, the part 10 described in step 1 is provided with a coating or surface structure corresponding to the desired surface properties.

As an alternative, the part described in step 1 can also be produced from photosensitive glass (e.g., known by the trade name Foturan) by structured exposure and subsequent development and, before being joined, can be provided with a coating and surface structure corresponding to the desired surface properties.

The starting material for the printing form 12 is present as a thin plate, film or sleeve (see process step A1 described hereinabove).

EXAMPLE 2

Figure 8:
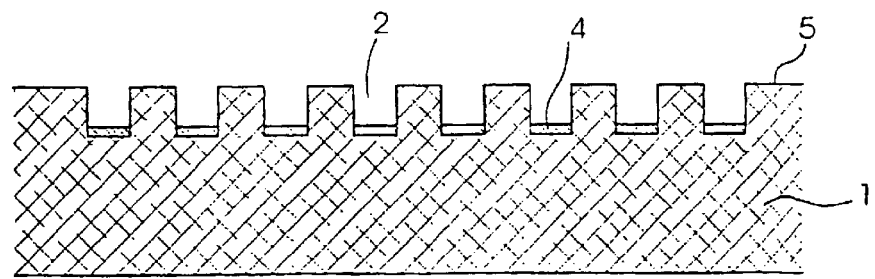
FIG. 8 is a diagrammatic sectional view of a printing form having a housing formed in one piece.

According to FIG. 8, the pot-like structure of the printing form is produced by various external processing steps on one and the same substrate. In this case, as opposed to example 1, blind holes 2 rather than through holes 6 are produced in the substrate. With respect to the starting situations A and B noted under example 1, the same is true for example 2 as for example 1.

Step 1:

The blind hole structure in the substrate is produced with one of the methods noted under example 1 in step 1.

Step 2:

a) The substrate structured in step 1 is coated as a whole with the provided absorber layer or
b) The substrate structured in step 1 is covered by a mask which covers the areas between the depressions. Coating with the absorber layer 4 is then carried out, preferably by an anisotropic coating process or
c) The printing form to be produced is completed in accordance with one of the processes described hereinabove, and the application of the absorber layer 4 in liquid/powder form (e.g., by rolling on) to the end of the elevations of a corresponding negative mold is then carried out. This negative mold is then introduced into the depressions in the previously embossed printing form in order to press the absorber layer onto the bottom of these depressions.

Step 3:

For all the cases a) to c) listed in step 2, after demolding, there will be an absorber layer at the bottom of the embossed depressions, which may still have to be dried or hardened. If procedure a) were chosen in step 2, then the absorber layer is located not only on the bottom of the depressions of the produced printing form but also on the surface of the lands between the depressions. For the case wherein the absorber layer does not have the surface properties needed for the suction printing process when in the solid state, the layer can subsequently be removed, for example, mechanically, chemically or wet chemically.

In the example 2 illustrated in FIG. 8, the printing form 1 is not assembled from a plurality of partial forms but is shaped from a single starting material. Layers 4 of absorber material are introduced into the blind holes 2, as was explained in conjunction with step 2 of the example. The starting material has a preferably ink-repellant surface 5. Both the printing form according to FIG. 7 and the printing form according to FIG. 8 may be thought of as a cross section through a detail of an outer cylindrical or casing surface of a cylinder. The printing form then has the form of a drum and of a pot, respectively, as already explained further hereinabove. Of course, the printing form according to FIGS. 7 and 8 can also have the form of a plate and of a cube, respectively.

The application of the absorber layer to a semifinished product or the bottom of the preformed blind holes for the case of a liquid starting state can also be carried out by micrometering and using the force of gravity or by spraying (in particular by a jet process, possibly electrically assisted). In this case, too, good wetting by the absorber liquid must be provided. If this wetting is not provided, a wetting promoter can also be sprayed on in a preparatory step or applied in another form. This also applies independently to the types of absorber application mentioned further hereinabove.

EXAMPLE 3

Figure 9A:
FIGS. 9a to 9d are sectional views showing different stages in another example of the production of a printing form according to the invention.
Figure 9B:
Figure 9C:
Figure 9D:
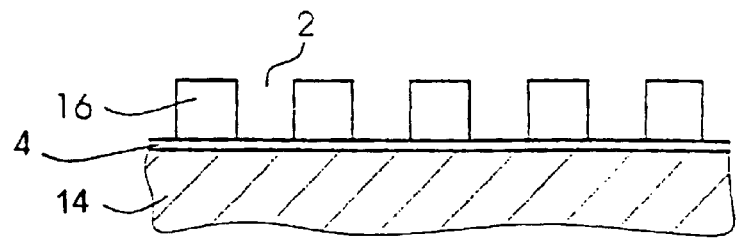

A further example relating to the production of a printing form according to the invention is illustrated in FIGS. 9*a* to 9*d*. In step (a) shown in FIG. 9*a*, the starting point is a starting material 14 in the form of a plate, film or sleeve, as has been described, for example, in example 1, step 2. In step (b) shown in FIG. 9*b*, the starting material 14 is covered with a structured or, as shown, a continuous absorber layer 4. The absorber layer 4 is then covered with a covering layer 16, as shown in FIG. 9c. In this case, it has proven to be particularly advantageous to use a hardenable layer, in particular a hardenable polymer layer, for the covering layer 16. This hardenable polymer layer can, for example, be applied as a polymer solution and then dried and polymerized by a physical or chemical process, so that a hardened layer is produced. Here, the polymer solution can be applied by any suitable desired process, such as spin coating, application by rolls or the like. Using these techniques, it is possible to achieve a uniform layer thickness. Following the application, the layer 16 can be hardened, it being possible, for example, for ultraviolet (UV) or thermal radiation to be used for the hardening or for initiating the hardening operation. It is likewise possible to effect hardening of the layer 16 by a chemical route, for example, by the action of catalysts or reagents, for example from the gas phase. With the aid of a suitable tool, in particular an embossing mold, a laser, an engraving or drilling tool or with the aid of an etching process, the blind holes 2 can then be introduced into the hardened covering layer 16. In this regard, care must be taken that the depth of the blind holes be selected so that a portion 4 covered with absorber is exposed at the bottom of the blind holes 2.

We claim:

1. A process for producing a printing form, which comprises:
   forming a multiplicity of blind holes opening into a surface of a spatial or three-dimensional structure of the printing form, the blind holes serving for receiving a medium therein;
   providing a propellant in the printing form for assisting in expelling the medium from the blind holes;
   providing as starting material for the spatial or three-dimensional structure a semifinished product having an ink-repellant property at the surface thereof; and
   embossing the blind holes in the semifinished product using an embossing mold.

2. The process according to claim 1, which further comprises, during insertion of the blind holes in the printing form, performing at least one of the steps of avoiding placement of the embossing mold with the surface thereof on the surface of the printing form located between the blind holes, and cleaning the surface of the printing form after the embossing.

3. The process according to claim 1, which further comprises providing a casting mold for casting the printing form, only partly filling the casting mold with casting compound, and subsequently filling the casting mold with a coating having ink-repellant properties.

4. The process according to claim 1, which further comprises providing the propellant in the form of an absorber layer heatable by electromagnetic radiation.

5. The process according to claim 4, which further comprises applying the absorber layer over the entire surface of the printing form provided with blind holes, including the inner surface of the blind holes, and then cleaning at least the area of the printing form surrounding the blind holes so as to remove the absorber layer therefrom.

6. The process according to claim 5, which further comprises hardening the absorber layer after it has been applied to the inner surface of the blind holes.

7. The process according to claim 4, which further comprises placing on the surface of the printing form, which is provided with the blind holes, a mask which covers the area located between the blind holes, and then coating the inner surface of the blind holes with the absorber layer, at least in a lower portion of the blind holes.

8. The process according to claim 4, which further comprises before embossing the blind holes, coating the embossing mold with the absorber layer on protrusions thereof provided for embossing the blind holes, and then lowering the protrusions of the embossing mold into the material of the printing form, and depositing the absorber layer on the inner surface of the blind holes.

9. The process according to claim 8, wherein the depositing of the absorber layer on the inner surface of the blind holes is on a bottom portion of the inner surface.

10. The process according to claim 4, which further comprises providing a semifinished product, producing the printing form from the semifinished product, and applying the absorber layer to the entire area of the surface of the semifinished product before the embossing step.

11. The process according to claim 10, which further comprises placing, on subareas assigned to the individual blind holes, protrusions of the embossing mold serving for inserting the blind holes into the printing form, and then pressing the protrusions into the printing form in order to form the blind holes, thereby depositing the absorber layer situated on the subareas in a bottom portion of the blind holes.

12. The process according to claim 11, which further comprises cleaning areal regions of the surface of the printing form located between the blind holes, after the blind holes have been formed.

13. The process according to claim 4, which further comprises providing a semifinished product, producing the printing form from the semifinished product, applying the absorber layer to the entire area of the surface of the semifinished product before the embossing step, and then structuring the applied absorber layer by chemical processes in subareas assigned to the individual blind holes.

14. The process according to claim 4, which further comprises providing a semifinished product, producing the printing form from the semifinished product and, before the embossing step, applying the absorber layer to the surface of the semifinished product by a mask in subareas assigned to the individual blind holes.

15. The process according to claim 4, which further comprises providing a semifinished product, producing the printing form from a the semifinished product and, before the embossing step, applying the absorber layer to the surface of the semifinished product in a structured manner by a printing operation in subareas assigned to the individual blind holes.

16. The process according to claim 4, which further comprises after embossing the blind holes, coating the embossing mold with an absorber layer on protrusions thereof provided for embossing the blind holes, and then lowering the protrusions of the embossing mold into the already embossed blind holes, and depositing the absorber layer on the inner surface of the blind holes.

17. The process according to claim 1, which further comprises assembling the printing form from a first partial form, as said semifinshed, and a second partial form.

18. The process according to claim 17, which further comprises providing the first partial form as a first substrate, and the second partial form as an uncoated second substrate, placing the partial forms above one another, and via the embossing mold, inserting the blind holes into the partial forms so that the blind holes reach at least as far as the second partial form.

19. The process according to claim 18, which further comprises separating the first partial form from the second partial form by lateral displacement, and then coating the second partial form by an absorber layer as the propellant in subareas assigned to the blind holes.

20. The process according to claim 19, wherein the propellant providing step includes performing a step selected from the group consisting of coating the subareas with a mask, coating the protrusions of the embossing mold serving to form the blind holes at the end faces thereof and sinking this coating into the respective holes in the second part form, and coating the subareas by a printing operation.

21. The process according to claim 20, which further comprises, after coating the second partial form, aligning the two substrates again with respect to one another so that the holes in the first partial form are aligned with one of the coating of the second partial form and the holes in the second partial form.

22. The process according to claim 19, which further comprises nonreleasably connecting the first partial form and the second partial form to one another by a step selected from the group thereof consisting of welding and adhesively bonding.

23. The process according to claim 19, which further comprises hardening at least the layer of the absorber within the blind holes after demolding the printing form which has been produced.

24. The process according to claim 17, which further comprises forming the second partial form from an uncoated second substrate; by the embossing mold, inserting the blind holes into the two partial forms, which are disposed above one another, so that the blind holes extend at least as far as the second partial form; and by the embossing mold, sinking a layer of absorber material as the propellant located in the portion of the holes in the second partial form into the appertaining holes.

25. The process according to claim 17, which further comprises providing the first partial form as a first substrate, and the second partial form as an uncoated second substrate, placing the partial forms above one another, and via the embossing mold, inserting the blind holes into the partial forms so that the blind holes reach into the second partial form.

26. A process for producing a printing form, which comprises:

forming a multiplicity of blind holes opening into a surface of a spatial or three-dimensional structure of the printing form, the blind holes serving for receiving a medium therein;

providing a propellant in the printing form for assisting in expelling the medium from the blind holes;

providing an injection mold for forming the blind holes;

filling the mold with a substance selected from the group consisting of a heated powder, a heated granulate, and a powder mixed with a binder, for molding the printing form; and opening the mold for releasing the thus molded printing form therefrom.

27. The process according to claim 26, which further comprises one of the steps of sintering and hardening the thus molded printing form.

28. The process according to claim 26, which further comprises selecting the powder and granulate, respectively, so that the printing form has an ink-repellant property at the surface thereof.

29. A printing form, comprising:

a spatial structure having a surface with a multiplicity of blind holes opening into the printing form;

a propellant disposed within said blind holes for permitting a temperature change in at least one medium located within the blind holes;

said spatial structure being an assembly of a first and a second partial form, said first partial form being formed with through holes which, at ends thereof facing towards said second partial form, meet subareas provided with the propellant.

30. The printing form according to claim 29, wherein said through holes formed in said first partial form are aligned with the subareas provided with the propellant.

31. The printing form according to claim 29, wherein said first and said second partial forms are united integrally with one another by adhesive bonding or welding.

32. The printing form according to claim 29, wherein said propellant is an absorber layer provided in a bottom portion of said blind holes, said blind holes extending through said first partial form to at least as far as the surface of said second partial form.

* * * * *